United States Patent [19]

Hagiwara et al.

[11] Patent Number: 4,840,491
[45] Date of Patent: Jun. 20, 1989

[54] RUBBER KNEADING METHOD

[75] Inventors: Yoshiaki Hagiwara, Tokyo; Hiromi Ishida; Takeyoshi Takahashi, both of Tochigi, all of Japan

[73] Assignee: Bridgestone Corporation, Tokyo, Japan

[21] Appl. No.: 89,803

[22] Filed: Aug. 27, 1987

[30] Foreign Application Priority Data

Aug. 27, 1986 [JP] Japan .................. 62-200770

[51] Int. Cl.$^4$ .................. B29B 1/08
[52] U.S. Cl. .................. 366/69
[58] Field of Search .................. 366/69, 71, 72, 73, 366/348, 349, 69–73, 91, 74; 425/201, 203, 209; 264/175, 349

[56] References Cited

U.S. PATENT DOCUMENTS

| | | | |
|---|---|---|---|
| 2,336,754 | 12/1943 | Schelhammer et al. | 264/175 |
| 2,336,944 | 12/1943 | Madge et al. | 264/175 |
| 2,534,291 | 12/1950 | Moss | 264/175 |
| 2,917,780 | 12/1959 | Petry | 264/175 |
| 4,311,658 | 1/1982 | Nicoll | 264/175 |
| 4,452,750 | 6/1984 | Handwerk et al. | 264/349 |

FOREIGN PATENT DOCUMENTS

| | | | |
|---|---|---|---|
| 0093520 | 7/1981 | Japan . | |
| 1100423 | 5/1986 | Japan | 425/201 |
| 735767 | 11/1952 | United Kingdom | 264/175 |

*Primary Examiner*—Robert W. Jenkins
*Attorney, Agent, or Firm*—Sughrue, Mion, Zinn, Macpeak, and Seas

[57] ABSTRACT

In a method of kneading rubber, rubber is kneaded with a kneading mixer, and the rubber thus kneaded is caused to pass through roll means to form a rubber sheet whose thickness is not more than 3 mm, whereby the rubber having a desired degree of plasticity can be obtained by using the kneading mixer only once.

7 Claims, 1 Drawing Sheet

RUBBER KNEADING METHOD

BACKGROUND OF THE INVENTION

This invention relates to a method of kneading rubber.

In the tire industry, heretofore rubber blocks only, or rubber blocks together with chemicals such as sulfur and carbon are kneaded in a kneading mixer called "Banbury mixer" so that the degree of plasticity is lowered.

The kneading mixer of this type is so slow in kneading speed that it is necessary to continue the kneading operation for a long period of time. However, such a long kneading operation would increase the temperature of the rubber thereby to cause a vulcanization reaction to adversely affect the quality of the rubber.

For the purpose of eliminating this difficulty, heretofore the following method is employed: When the temperature of the rubber is increased to a predetermined temperature which is lower than the quality change start temperature, the rubber is taken out of the kneading mixer and cooled down. Then, the rubber thus cooled is kneaded in the kneading mixer again until the degree of plasticity of the rubber reaches a predetermined value. Therefore, the conventional method is disadvantageous in that the productivity is low, and the consumption of energy is large. In the conventional method, while being drawn out of the kneading mixer the kneaded rubber is formed into a rubber sheet about 8 mm in thickness, however, in the case of such a heavy rubber sheet, the rubber is not kneaded at all.

SUMMARY OF THE INVENTION

Accordingly, an object of this invention is to eliminate the above-described difficulties accompanying a conventional rubber kneading method.

The foregoing object and other objects of the invention have been achieved by the provision of a rubber kneading method which, according to the invention, comprises a step of kneading rubber with a kneading mixer; and a step of discharging the rubber thus kneaded from the kneading mixer and allowing the rubber thus discharged to pass through roll means to form a rubber sheet whose thickness is not more than 3 mm.

That is, in the method of the invention, rubber blocks only or together with chemicals such as sulfur and carbon are kneaded with the kneading mixer, and the rubber thus kneaded is passed through the roll means to form a rubber sheet whose thickness is 3 mm or less. Therefore, when being passed through the roll means, the rubber is sheared and kneaded greatly, and the degree of plasticity of the rubber is positively decreased. Thus, the method of the invention can provide rubber having a desired degree of plasticity without kneading it with the kneading mixer again.

The nature, principle and utility of the invention will become more apparent from the following detailed description when read in conjunction with the accompanying drawings.

DETAILED DESCRIPTION OF THE INVENTION

One preferred embodiment of this invention will be described with reference to the accompanying drawings.

Figure 1:
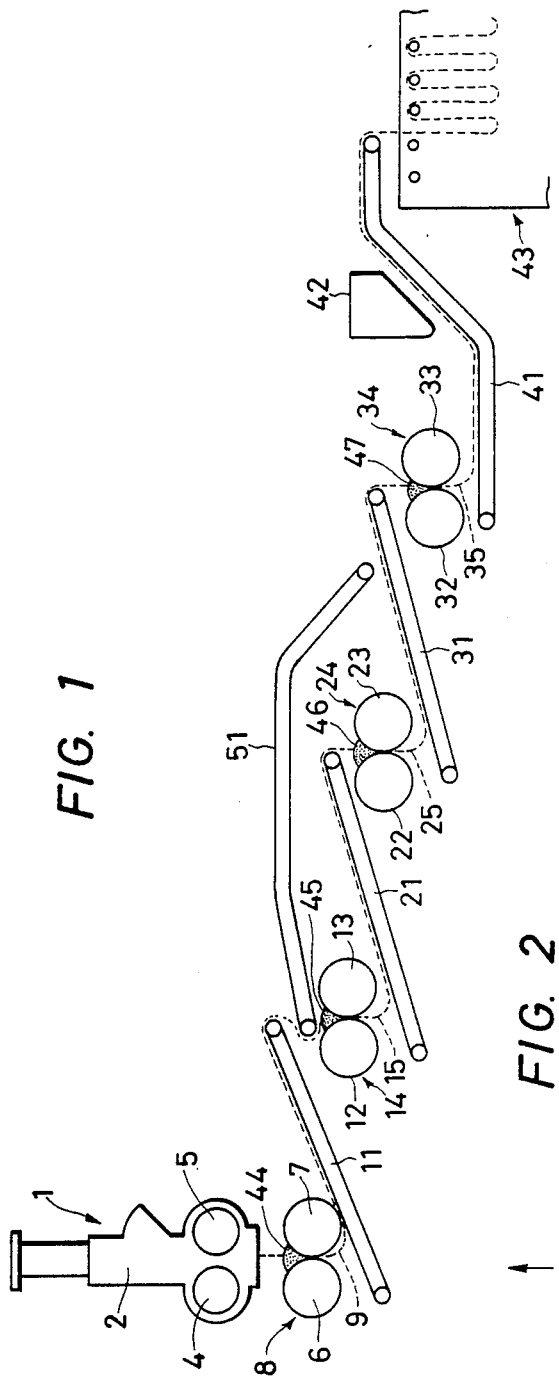
FIG. 1 is a side view showing an apparatus for practicing a rubber kneading method according to this invention.
Figure 2:
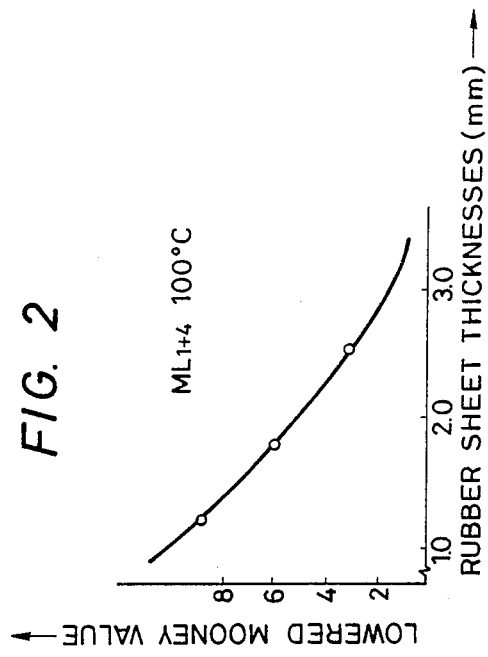
FIG. 2 is a graphical representation indicating rubber sheet thickness with lowered Mooney value for a description of the method of the invention.

In FIG. 1, reference numeral 1 designates a kneading mixer called "a Banbury mixer". A pair of rotors 4 and 5 for kneading rubber only or together with chemicals such as sulfur and carbon are rotatably supported in the chamber 2 of the kneading mixer 1. A first roll mechanism 8 consisting of a pair of parallel rolls 6 and 7 is disposed just under the kneading mixer 1. The first roll mechanism 8 thus disposed operates to deform the rubber coming out of the kneading mixer 1 into a rubber sheet 9 having a thickness, for instance about 8 mm, which can be handled with ease. Even if the rubber is deformed into the rubber sheet 9 having a thickness of this order, the rubber is scarcely kneaded. A first conveyor 11 is arranged below the first roll mechanism 8 in such a manner that its upstream end is right below the mechanism 8. The first conveyor 11 is adapted to convey the rubber sheet 9 to its downstream end. A second roll mechanism 14 consisting of a pair of rolls 12 and 13 is provided just under the downstream end of the first conveyor 11. The second roll mechanism 14 receives the rubber sheet 9 from the first conveyor 11 and deforms it into a rubber sheet 15 whose thickness is 3 mm or less. In this operation, the rubber is sheared and kneaded greatly because, when the rubber sheet passes through the rolls 12 and 13, the front and rear surfaces of the rubber sheet are much different in shearing speed from the middle therebetween. As a result, the degree of plasticity of the rubber is greatly decreased, and in kneading rubber together with chemicals the degree of dispersion of the chemicals is increased. However, if the thickness of the rubber sheet 15 is larger than 3 mm, as shown in FIG. 2 the degree of plasticity is scarcely lowered; that is, the kneading effect cannot be substantially obtained. Therefore, the thickness of the rubber sheet 15 must be 3 mm or less. In FIG. 2, Mooney values (measured with a Mooney viscosimeter) are employed to indicate a variation in the degree of plasticity of the rubber with a variation in the thickness of the rubber sheet. That is, in FIG. 2, the horizontal axis represents rubber sheet thicknesses in millimeters (mm), and the vertical axis represents lowered Mooney values, which are the differences between the Mooney values of the rubber to be formed into rubber sheets and those of the rubber sheets, in Mooney units. The graph of FIG. 2 has been formed on the results of the experiments in which hard rubber having an initial Mooney value of 80 points of higher (100° C.) was kneaded.

It is preferable that the thickness of the rubber sheet 15 is not more than 2 mm, because in this case the degree of plasticity is decreased as much as one kneading operation of the kneading mixer 1; that is, the number of times of kneading the rubber with the mixer can be positively decreased.

Further in FIG. 1, reference numeral 21 designates a second conveyor whose upstream end is located just below the second roll mechanism 14. The second conveyor 21 operates to convey the rubber sheet 15 towards its downstream end. A third roll mechanism 24 comprising a pair of rolls 22 and 23 is disposed right below the downstream end of the second conveyor 21.

The third roll mechanism 24 receives the rubber sheet 15 from the second conveyor 21 and deforms it into a rubber sheet 25 whose thickness is not more than 3 mm.

A third conveyor 31 is arranged under the third roll mechanism 24 in such a manner that its upstream end is located just below the third roll mechanism 24. The conveyor 31 operates to convey the rubber sheet 25 towards its downstream end. A fourth roll mechanism 34 comprising a pair of rolls 32 and 33 is disposed just below the downstream end of the third conveyor 31. The mechanism 34 operates to receive the rubber sheet 25 from the third conveyor 31 and deform it into a rubber sheet 35 having a desired thickness and a desired width.

A fourth conveyor 41 is extended under the fourth roll mechanism 34 in such a manner that its upstream end is just below the fourth roll mechanism 34. The conveyor 41 is adapted to convey the rubber sheet 35 towards its downstream end. An mold release applying device 42 is positioned above the middle (in the longitudinal direction) of the conveyor 41. The device 42 operates to apply mold release to both sides of the rubber sheet 35 being conveyed by the fourth conveyor 41. A drying device 43 is provided right below the downstream end of the fourth conveyor 41. The device 43 is used to dry the rubber sheet 35 unloaded from the fourth conveyor 41.

Further in FIG. 1, reference numerals 44, 45, 46 and 47 designate the banks of rubber caught by the first, second, third and fourth roll mechanisms 8, 14, 24 and 34, respectively.

The rubber kneading apparatus of the invention further comprises a bypass conveyor 51 which is laid in such a manner that its upstream end is positioned between the downstream end of the first conveyor 11 and the second roll mechanism 14 and its downstream end is disposed above the downstream end of the third conveyor. When it is unnecessary to knead rubber with the second and third roll mechanisms, the bypass conveyor 51 is used to convey the rubber sheet 9 directly to the fourth roll mechanism 34 bypassing the second and third roll mechanisms 14 and 24.

The operation of the rubber kneading apparatus thus constructed will be described.

Rubber blocks.only or together with chemicals such as sulfur and carbon are put in the chamber 2 of the kneading mixer and are then kneaded by rotation of the rotors 4 and 5 for a predetermined period of time. When the temperature of the rubber is increased to a maximum temperature slightly below the temperature at which the rubber starts changing its quality, the rubber is delivered from the chamber 2 to the first roll mechanism 8. The rubber thus delivered is caused to pass through the pair of rolls 6 and 7, to form the rubber sheet 9 while forming the rubber bank 44.

The rubber sheet 9 thus formed is conveyed to the second roll mechanism 14 by the first conveyor 11. At the second roll mechanism 14, the rubber sheet 9 is passed through the pair of rolls 12 and 13 while forming the rubber bank 45, to provide the rubber sheet 15 whose thickness is 3 mm or less. Therefore, the rubber is sheared and kneaded greatly, and the degree of plasticity is markedly decreased.

The rubber sheet 15 is delivered to the third roll mechanism 24 by the second conveyor 21. The rubber sheet 15 is deformed by the third roll mechanism 24 into the rubber sheet 25 whose thickness is 3 mm or less, again. As a result, the degree of plasticity is greatly decreased again; for instance it is decreased to a required value. In the latter case, it is unnecessary to knead the rubber with the kneading mixer again. This eliminates one of the difficulties accompanying the conventional method.

The rubber sheet 25 is conveyed by the third conveyor 31 to the fourth roll mechanism 34. At the mechanism 34, the rubber sheet 25 is deformed into the rubber sheet 35 having a desired thickness and width. The rubber sheet 35 is applied with mold release by the mold release applying device 42 while being conveyed by the fourth conveyor 41. The rubber sheet 35 thus treated is delivered to the drying device 43, where it is dried.

The third roll mechanism may be eliminated from the rubber kneading apparatus described above so that the rubber is roll-kneaded only with the second roll mechanism 14.

As is apparent from the above description, the method of the invention makes it unnecessary to knead the rubber with the kneading mixer again, thus improving the productivity and contributing to the economical use of energy.

We claim:

1. A method of kneading rubber comprising the steps of:
    kneading rubber with a kneading mixer;
    discharging said rubber thus kneaded from said kneading mixer;
    passing said rubber thus discharged through first roll means to form a first rubber sheet having a predetermined thickness;
    passing rubber of said first rubber sheet through second roll means to form a second rubber sheet whose thickness is 2 mm or less; and
    passing rubber of said second rubber sheet through third roll means to form a third rubber sheet having a desired final thickness;
    wherein said predetermined thickness is thicker than 3 mm.

2. A method as claimed in claim 1, in which said predetermined thickness is of the order of 8 mm.

3. A method as claimed in claim 1, in which said second roll means comprise a first pair of rollers and second pair of rollers for forming said second rubber sheet.

4. A method as claimed in claim 1, further comprises a step of drying said third rubber sheet.

5. A method as claimed in claim 1, further comprising the steps of banking said rubber before said step of passing through said first roll means.

6. A method as claimed in claim 1, further comprising the step of banking said first rubber sheet by said second roll means before the step of passing rubber from said first rubber sheet through said second roll means.

7. A method as set forth in claim 1, further comprising the step of banking said second rubber sheet by said third roll means before the step of passing rubber from said second rubber sheet through said third roll means.

* * * * *